United States Patent [19]

Guerillot

[11] Patent Number: 4,709,227

[45] Date of Patent: Nov. 24, 1987

[54] METHOD AND DEVICE FOR INSERTING A DIGITAL SIGNAL IN A CHANNEL WITH HIGHER FLOW RATE

[75] Inventor: Yves M. N. Guerillot, Paris, France

[73] Assignee: Societe Anonyme de Telecommunications, France

[21] Appl. No.: 847,636

[22] Filed: Apr. 3, 1986

[30] Foreign Application Priority Data

Apr. 4, 1985 [FR] France .................................. 85 05155

[51] Int. Cl.$^4$ ............................................. H03M 7/00
[52] U.S. Cl. ............................. 340/347 DD; 360/40; 370/83; 370/102; 371/55; 375/112
[58] Field of Search ................... 340/347 DD; 360/40; 370/83, 84, 99, 102; 371/17, 20, 40, 55, 69; 375/112

[56] References Cited

U.S. PATENT DOCUMENTS

| | | | |
|---|---|---|---|
| 3,622,983 | 11/1971 | Deregnaucourt | 340/146.1 |
| 3,953,673 | 4/1976 | Dorward | 340/347 DD |
| 4,025,720 | 5/1977 | Pachynski, Jr. | 375/112 X |
| 4,215,245 | 7/1980 | Bellisio | 370/84 |
| 4,517,552 | 5/1985 | Shirota et al. | 340/347 DD |

OTHER PUBLICATIONS

ICC '79 Conference Record of the International Conference on Communications, Boston, Mass., vol. 4 des 4, 10-14 Jun. 1979, pp. 53.2.1-53.2.5, IEEE, New York.

Primary Examiner—William M. Shoop, Jr.
Assistant Examiner—Richard K. Blum
Attorney, Agent, or Firm—Jacobs & Jacobs

[57] ABSTRACT

A method and device for inserting a digital signal in a channel at a higher flow rate is provided, for example for transcribing from 704 Kbit/s into 2048 Kbit/s, wherein each binary element of the low flow rate channel is associated with a triplet whose first two bits are identical to the bit to be transmitted, and whose third bit is in the inverse state. Such a triplet is provided for the first ten bits of a sequence of eleven bits, the eleventh bit being associated with a doublet whose two bits are identical to the bit to be transmitted.

10 Claims, 6 Drawing Figures

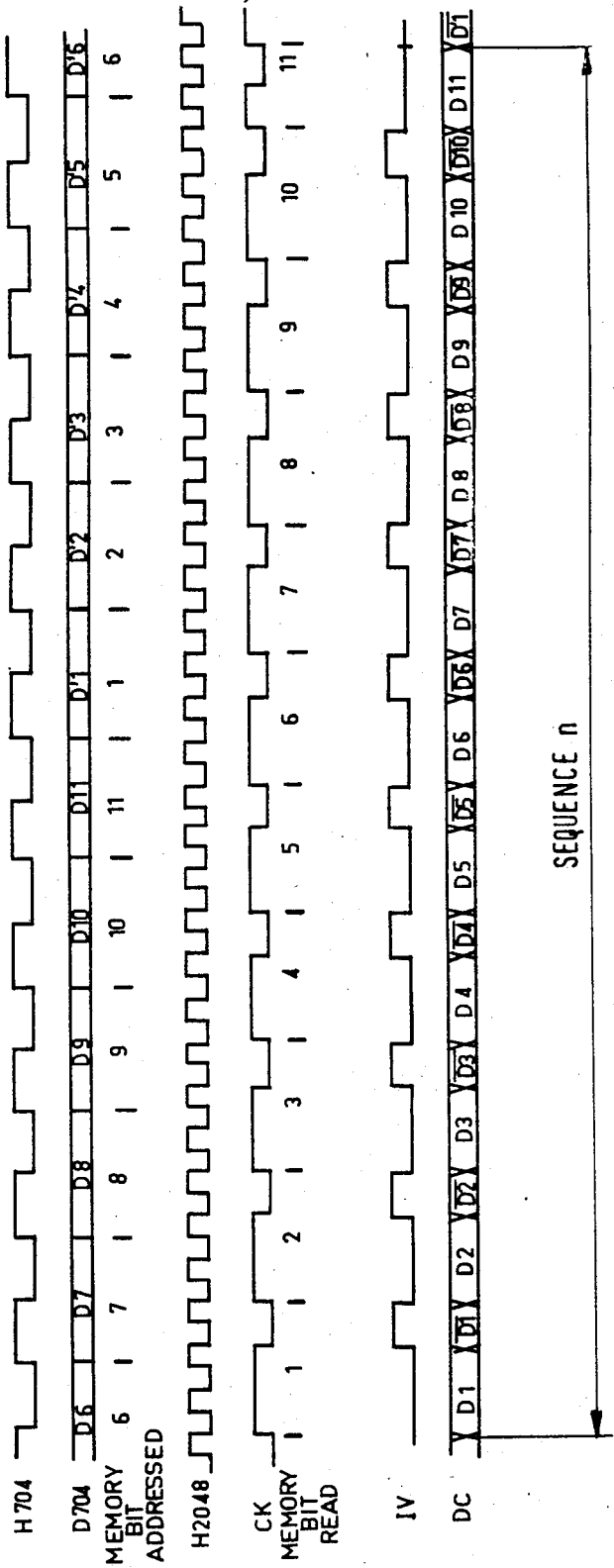
FIG_2_

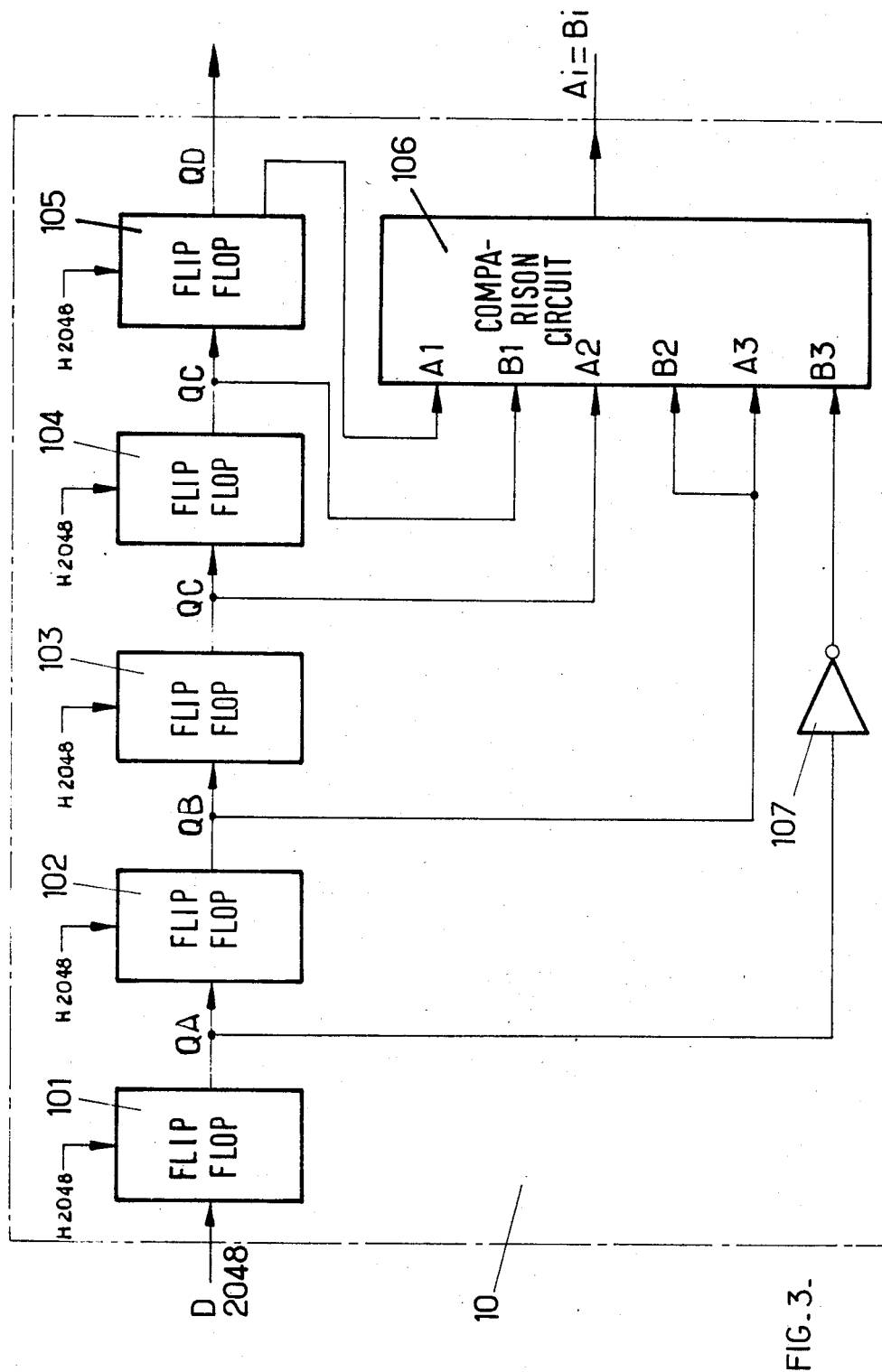
FIG._3_

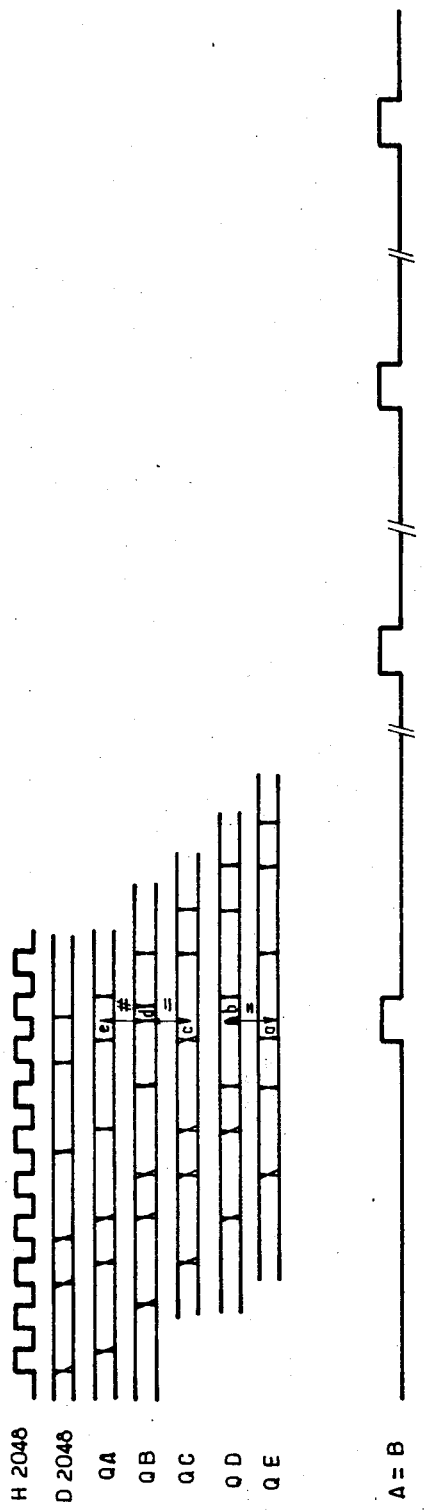

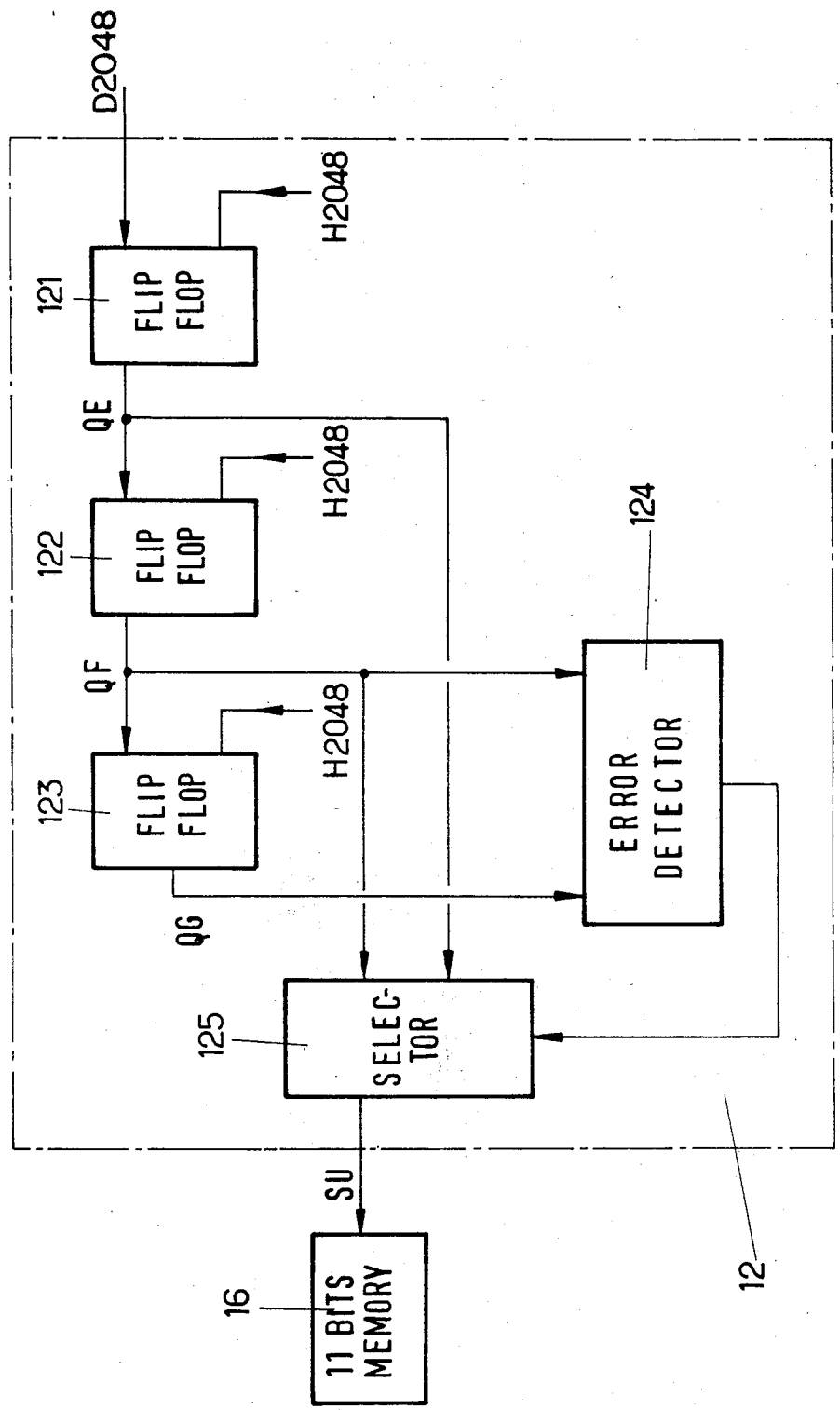
FIG_5_

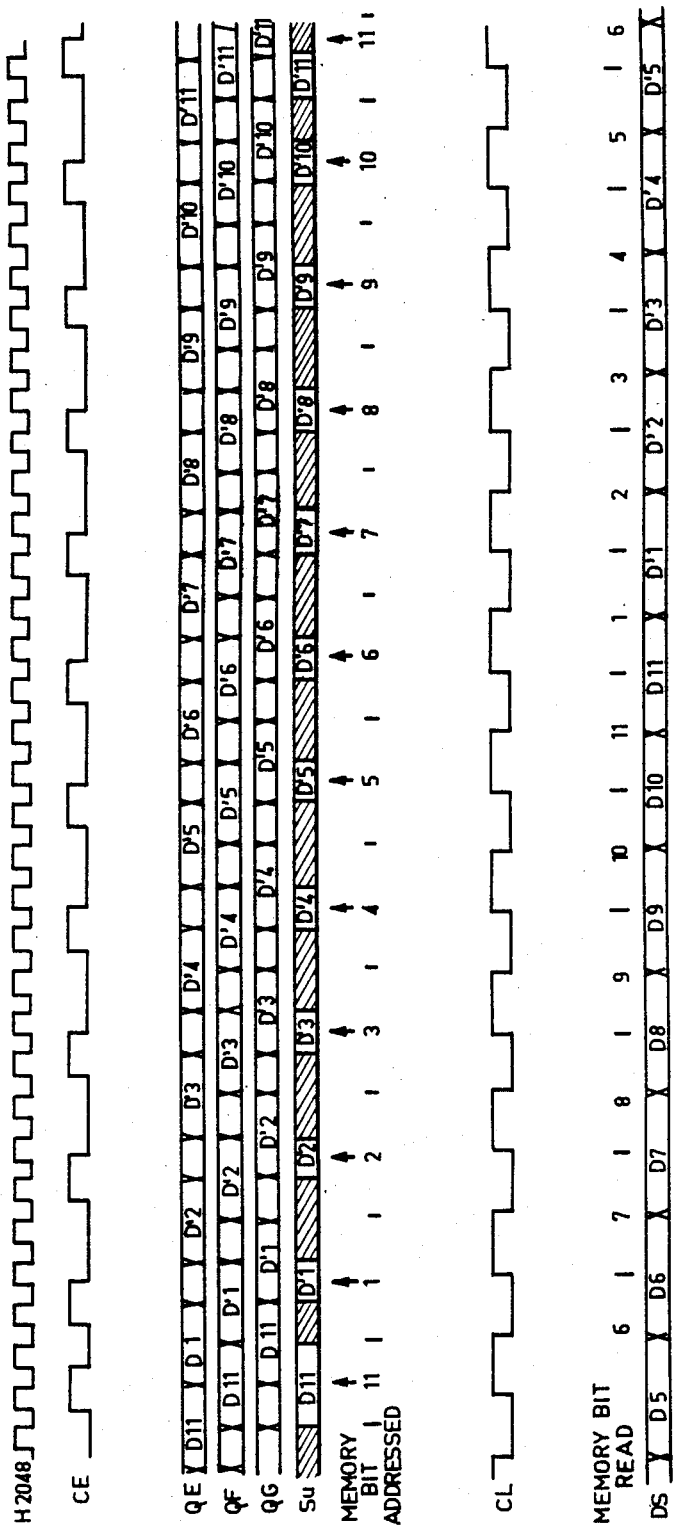
FIG_6_

METHOD AND DEVICE FOR INSERTING A DIGITAL SIGNAL IN A CHANNEL WITH HIGHER FLOW RATE

BACKGROUND OF THE INVENTION

The present invention relates to the digital transmission of coded information and more particularly transcribing of this information for inserting it in a digital channel with higher flow rate.

The invention applies particularly to the bilateral transmission of digital information at the rate of 704 Kbit/s, over a short wave link offering accesses at the rate of 2048 Kbit/s, by simply replacing the junction cards of the terminal equipment.

For obtaining such an increase in flow rate, a man skilled in the art will quite naturally think of inserting additional bits in the digital frame, in using a justification method or any other method well described in the technique. Such methods however require synchronization, for example using a frame locking word.

SUMMARY OF THE INVENTION

The present invention aims at obtaining an increase in the flow rate of a digital channel without using any particular synchronization. The invention consists essentially in transcribing the information of the data signal in a specific way.

The system of the invention applies to data transmitted not only by cables but also by short wave links, by optical fibers or by any other means provided that they are codirectional junctions.

The system of the invention avoids using a scrambler-unscrambler at the 704 Kbit/s level, which avoids increasing transmission errors. In fact, the essential function of such scramblers-unscramblers is to increase the richness of transitions in the data channel. And the transcribing of the invention is such that it increases precisely the transition richness whatever the contents of the message to be transmitted.

The complexity of the transcribing device of the invention is extremely reduced thanks to the system of the invention. The system of the invention provides great advantages such as the provision of alarms should the HDB3 signal be absent at the input of the junction or should the binary 2048 Kbit/s signal be absent at the output of the frame demultiplexer.

For this, the invention provides a method of inserting a digital signal at a given flow rate in a channel with higher flow rate, in which said digital signal is transformed into a binary signal associated with a clock signal, wherein this binary signal at the lower flow rate is transcribed into a binary signal at the higher flow rate, said transcribing resulting, in each sequence of n bits, n being a natural integer, in a substitution of each bit by a bit packet of one of the following types: doublet and triplet, each triplet being formed of the repetition of the bit to be transmitted for the first two and of its inverse for the third, each doublet being formed by the simple repetition of the bit to be transmitted, the sequence thus transcribed then being formed of p bits, p being a natural integer greater than n.

In a preferred application of the invention, the high flow rate channel has a binary flow rate of 2048 Kbit/s and the binary signal a flow rate of 704 Kbit/s, each low flow rate sequence being formed of 11 bits and being transcribed into a sequence of 32 bits so that the first ten bits are replaced by ten triplets and the eleventh bit is replaced by a doublet.

The transcribing device for putting the method of the invention into practice comprises, on the emission side, means for recovering the clock signal $H_o$ from the bipolar signal, means for storing the n binary elements sequences in a memory, means for reading out said bits in the form of p binary elements sequences at the timing $H'$ of a time base synchronized by the low flow rate clock signal $H_o$, said timing $H'$ being derived from the timing $H_o$ by a phase locking loop, means for transcribing each bit of the n binary elements sequence into a triplet or doublet and forming a p binary elements sequence.

On the reception side, the device of the invention comprises means for recognizing each sequence of p binary elements and synchronizing the low flow rate clock $H_o$, means for selecting a bit from each triplet and a bit from each doublet, means for writing into a memory the selected bits, means for reforming the low flow rate bipolar signal by reading from the memory at the timing of the low rate clock $H_o$.

In a preferred embodiment of the invention, the means for recognizing each p binary elements sequence at reception comprise means for recognizing a doublet and the three bits following a doublet.

Advantageously, the means for recognizing a doublet and the three bits following a doublet comprise means for comparing the identity of the bits of the doublets, the identity of the bits of the triplet following the doublet, after inversion of the last bit of the triplet.

Advantageously, the means for recognizing each sequence comprise five cascade connected flip flops delivering five signals to the input of a comparison circuit which simultaneously compares five successive bits and determines if it is doublet followed by a triplet.

According to another characteristic of the invention, the means for selecting a bit from each triplet and a bit from each doublet comprise means for selecting the second bit of the triplet when there is identity between the first two, or the inverse of the third bit of the triplet when there is not identity between the first two.

The means for selecting a bit from each doublet comprise means for selecting the second bit of each doublet.

In addition, these means for selecting a bit from each triplet and a bit from each doublet comprise three cascade connected flip flops, the last two delivering information to the input of an error detector, the first two delivering information to the input of a selector, said selector being driven by the output of said error detector, the output of said selector delivering the selected information.

The invention provides great advantages such as error detection and even error correction.

BRIEF DESCRIPTION OF THE DRAWINGS

Other features and advantages of the invention will be clear from the following description illustrated by the drawings, in which

FIG. 2 shows a timing diagram of the signals available at the output of the transmission blocks.

FIG. 3 illustrates the sequence detection circuit of FIG. 1.

FIG. 4 shows a timing diagram explaining the recovery of synchronization.

FIG. 5 shows the decoding circuit of FIG. 1, and

FIG. 6 shows a timing diagram of the signals obtained at reception, providing transcribing from 2048 Kbit/s into 704 Kbit/s.

DESCRIPTION OF THE PREFERRED EMBODIMENT

Figure 1:
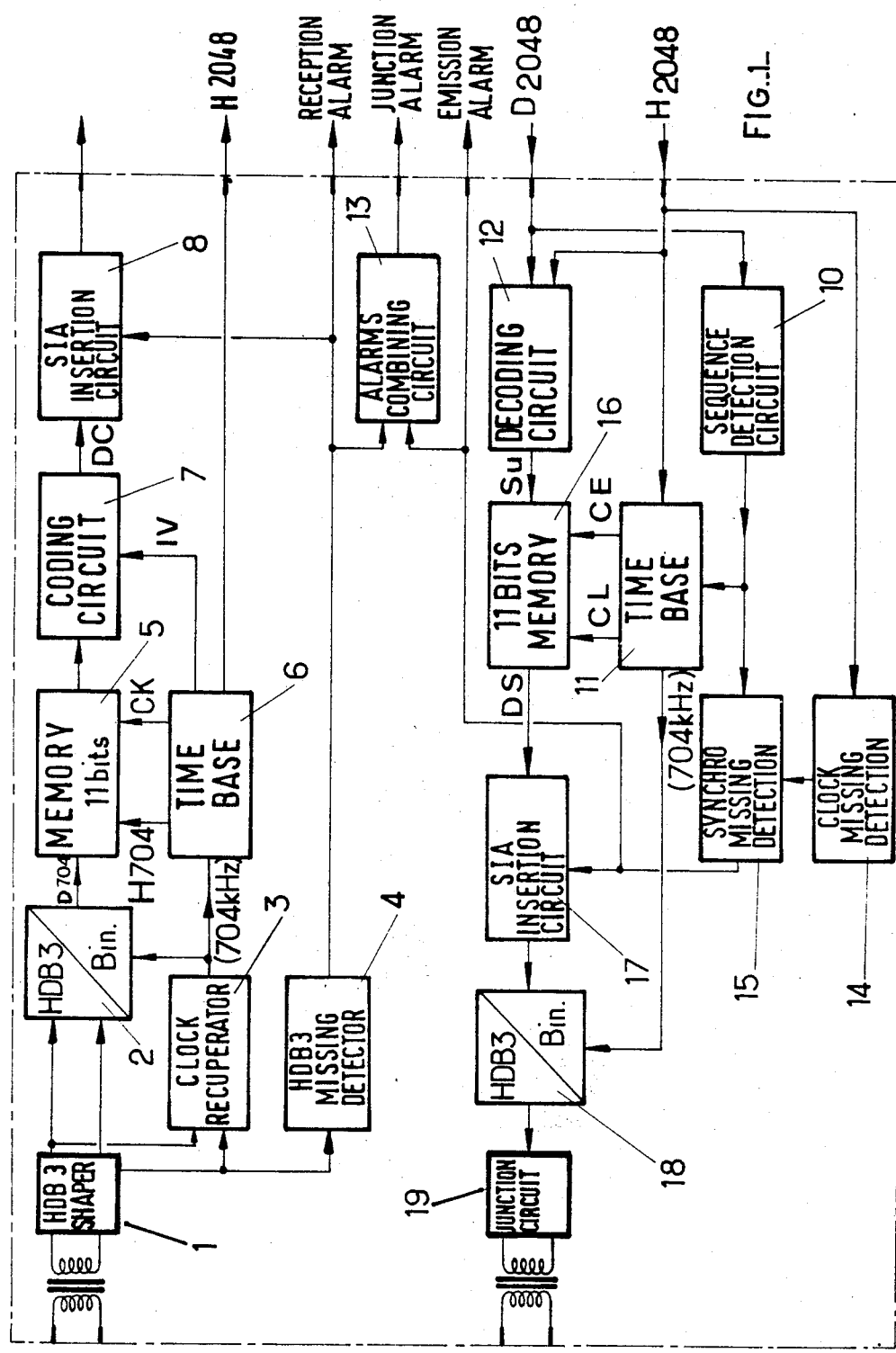
FIG. 1 is a general diagram of the transmission-reception system for transcribing information in accordance with the invention.

Referring to FIG. 1, the signal HDB3, for example, is shaped by a circuit 1 well known to a man skilled in the art which delivers two signals HDB+ and HDB− corresponding to the positive and negative polarities of the bipolar signal HDB3 at the input of a circuit 2. This circuit 2 receives the 704 KHz clock signal from the clock recuperator 3. This circuit 3 recovers the clock signal with the exact phase of the incoming 704 Kbit/s data signal by connecting itself to the output terminals of circuit 1. Circuit 2 therefore transforms the bipolar signal to a binary signal. This binary signal D704 is stored in a memory 5 by groups of 11 bits at the timing of a signal $H_o$, here the signal H704 at 704 KHz, shown in the timing diagram of FIG. 2, delivered by the time base 6. These 11 bits are read out from memory 5 at the timing of the clock signal CK. This clock signal CK is a 704 KHz clock on average but is synchronous with the clock signal H2048 at 2048 KHz delivered by the time base 6, derived from the frequency 704 KHz by a phase locking loop for example. The data read out from memory 5 at the timing of signal CK are processed by a circuit 7 which is a coding circuit in accordance with the invention. The coding circuit 7 causes each bit read out from memory 5 to be replaced by a triplet in so far as the ten first bits read out from memory 5 are concerned, and by a doublet in so far as the eleventh bit is concerned. In addition, each triplet is such that the first two bits of the triplet are in the state of the bit to be transmitted, the third bit is in the opposite state. The doublet, on the other hand, is formed of two bits in the state of the bit to be transmitted.

Referring to the timing diagram, the signal IV is the signal controlling inversion of the third bit of the triplet whereas the signal DC is the 2048 KHz data signal from the coding circuit 7 of the invention. A sequence n, for example, is thus formed of 32 bits comprising ten triplets and a doublet. This signal DC is applied to the input of an alarm insertion circuit 8 which replaces it by an alarm inhibition signal SIA, should the incoming signal HDB3 be missing, detected for example by a circuit 4 at the output of circuit 1.

Thus, increase of the flow rate is provided in the ratio 32/11, which corresponds to the standardized flow rate of 2048 Kbit/s at the output of circuit 8.

Similarly, the system of the invention provides for recovery of the signal HDB3 at the 704 Kbit/s rate from the 2048 Kbit/s channel. For this, the 2048 Kbit/s data signal ($D_{2048}$) is applied on the one hand to the input of a decoding circuit 12 and on the other to the input of a sequence detection circuit 10.

FIG. 3 illustrates the sequence detection circuit 10. This sequence identification circuit is based on the principle of recognition of a doublet and of the triplet following this doublet. In fact, if five successive bits can be checked and in particular if a doublet is recognized, it is certain that a sequence has been recognized. Thus, considering the following configuration:

$$\ldots (x, x, \bar{x})(a, b)(c,d,e)(y,y,\bar{y})\ldots$$

it is sufficient, for reliably decoding the 2048 KHz sequence to recognize five successive bits; thus, a doublet has been recognized if a=b and a triplet if c=d and d≠e. For carrying out such comparisons, five flip flops are essentially provided, as shown in FIG. 3, placed in cascade 101, 102, 103, 104, 105. The signal $D_{2048}$ is applied to the input of flip flop 101. The output of flip flop 105 is applied to the input $A_1$ of a comparison circuit 106. The output of flip flop 104 is applied to the input $B_1$ of the comparison circuit 106. The output of flip flop 103 is connected to the input $A_2$ of the comparison circuit 106. The inputs $A_3$ and $B_2$ of the comparison circuit 106 receive the signal output by the flip flop 102. The signal from flip flop 101, finally, is applied to the input $B_3$ of the comparison circuit 106 after inversion by the inverter circuit 107. These different flip flops operate at the timing of a clock signal H', here the clock signal H 2048 associated with the signal D2048.

FIG. 4 shows a timing diagram of these different comparisons. The data signal D2048 is applied to the input of flip flops 101 to 105 which allows the simultaneous comparison ($A_i = B_i$) of bits, a, b, c, d, e to be carried out by means of the circuit 106. This sequence detection circuit 10 causes phase resetting of the time base 11 by locking this clock to the beginning of a sequence. This time base 11 receives the H2048 clock signal and, by dividing the timing by 11/32, for example by means of a phase loop, restores the initial 704 KHz timing.

The data D2048 is thus also applied to the input of a decoding circuit 12 which operates at the incoming 2048 KHz timing. This circuit is illustrated in FIG. 5. It is essentially formed of three flip flops 121, 122, 123 connected in cascade, the output of the last two flip flops being connected to the input of an error detector 124. The output of this error detector is connected to the input of a selector 125 which also receives the signals from the flip flops 121 and 122. The output of selector 125 delivers the corrected signal to memory 16. In fact, it is convenient to use redundancy for correcting the errors by comparison of the bits contained in the triplets and the doublets.

The errors should be respected while respecting the following correction criterion. If we call 1, 2, 3 the bits forming a triplet, if bit 1 is equal to bit 2, the information taken into account is bit 2; if bit 1 is different from bit 2, the bit to be transferred to memory 16 should be corrected and then the inverse of bit 3 is adopted.

For the doublets, it is not possible to define the criterion of choice. In this case, the second bit of the doublet is selected arbitrarily.

The timing diagram of FIG. 6 illustrates one example of the choice of the bits to be taken into account when writing into memory 16.

The signal CE is a writing clock signal synchronized by the recognition of the doublet at the output of circuit 10, whose falling fronts define the time of validating the selected bit. The signals QE, QF, QG are respectively the signals from the three flip flops 121, 122, 123. Signal Su is the corrected signal at the output of selector 125 which the writing clock will validate for writing into memory 16.

Signal CL is a reading clock signal delivered by the time base 11 for reading this memory 16. It is a 704 KHz clock synchronous with the 2048 KHz clock. The bits (signal DS) are therefore read out from memory 16 at the timing of this reading clock CL for application to the input of the alarm insertion circuit 17. A shift of about half a memory length, provided by the time base 11, will be noted between writing and reading.

The alarms are supplied, either by a circuit 14 which detects the absence or lack of incoming 2048 KHz signal, or by a circuit 15 which checks the operation of the recognition of the sequence effected by circuit 10. At the output of circuit 17, the 704 Kbit/s signal is converted into HDB3 code for example, more generally, into a bipolar code by means of circuit 18 before being retransmitted by means of the junction 19 at the 704 Kbit/s rate.

The sequence recognition system reduces the complexity of the decoding device of the invention.

Transcribing obtained in accordance with the invention by means of buffer memories associated with phase locking loops, provides a jitter reduction function on the digital train.

The present invention provides a quite particular advantage when transmission of the two Mbit/s signal takes place by short wave link, for example by means of a four state phase coding. In fact, possible error at the level of the differential decoding proper to the transmission means creates two errors in the 2 Mbit/s signal. The correction of the system of the invention compensates to a large extent for the increase of errors due to the differential coding because of the processing provided at reception, as shown in the following table, in which R represents the ratio between the error rate in the 704 Kbit/s signal and the error rate in the 2 Mbits/s signal.

|  | without error correction according to the invention | with error correction according to the invention | |
|---|---|---|---|
| 2 Mbit/s transmission mode | without coding or with differential 4 $\phi$ coding | without coding | with differential 4 $\phi$ coding |
| R | 1/1 | 1/11 | 6/11 |

The number of code errors $N_E$ may be measured at the output of the error detector 124. The error rate $\tau_E$ may be worked out from the following relationship:

$$N_E = \tau_E \cdot D \cdot 35/12$$

where D=704 Kbit/s.

The present invention applies to any change of flow rate as long as the high frequency of the transmission channel is not a multiple frequency of the low frequency, so as to find again the doublet requirement.

In FIG. 1 a block 13 has been shown for combining the transmission-reception alarm. Thus, the reception alarm signal delivered either by circuit 14 or by circuit 15 is also transmitted to block 13. Similarly, on the emission side, the detection of a lack of signal by the circuit 4 is also transmitted to circuit 13.

What is claimed is:

1. A method of inserting a digital signal at a given flow rate in a channel with a higher flow rate, comprising the steps of: transforming said digital signal into a binary signal associated with a clock signal; and transcribing said binary signal at the lower given flow rate into a binary signal at the higher flow rate, said transcribing step including the step of substituting, in each sequence of n bits, n being a natural integer, each of the first (n−1) bits by a triplet, and substituting the last bit by a doublet, said transcribing step further including the step of forming each triplet by the repetition of the bit to be transmitted for the first two and the inverse thereof for the third, and the step of forming each doublet by the simple repetition of the bit to be transmitted, and the step of forming the sequence thus transcribed with p bits, p being a natural integer greater than n.

2. A method of inserting a digital signal at a flow rate of 704 Kbits/s in a channel with a flow rate of 2048 Kbits/s, comprising the steps of: transforming said digital signal into a binary signal associated with a clock signal; and transcribing said binary signal at 704 Kbits/s into a binary signal at 2048 Kbits/s, said transcribing step including the step of substituting, in each sequence of 11 bits, each of the first 10 bits by triplet, and substituting the 11th bit by a doublet, said transcribing step further including the step of forming each triplet by the repetition of the bit to be transmitted for the first two and the inverse thereof for the third, and the step of forming each doublet by the simple repetition of the bit to be transmitted, and the step of forming the sequence thus transcribed with 32 bits.

3. A device for transmitting a bipolar signal at a given low flow rate over a higher rate channel and for receiving from said channel, a bipolar signal at said given low flow rate, said device comprising: on the emission side, means for recovering a low flow rate clock signal $H_o$ from the bipolar signal; means for storing sequences of n bits, n being a natural integer, in a memory; means for reading out from the memory said sequences of n bits in the form of sequences of p bits, p being a natural integer, at a timing H' of a time base, synchronized by the low flow rate clock signal $H_o$; phase locking loop means for deriving said timing H' from the low flow rate clock signal $H_o$; means for transcribing each of the first (n−1) bits of each sequence of n bits into a triplet, and for transcribing the last bit of each sequence of n bits into a doublet, and for thereby forming a p bits sequence; and, on the reception side, means for recognizing each sequence of p bits and synchronizing the low flow rate clock signal $H_o$, means for selecting a bit from each triplet and a bit from each doublet, means for writing into the memory the selected bits, and means for reforming the low flow rate bipolar signal by reading from the memory at the timing of the low rate clock signal $H_o$.

4. The device as claimed in claim 3, wherein said means for recognizing each p bits sequence at the reception side comprise means for recognizing a doublet and the three bits following the doublet.

5. The device as claimed in claim 4, wherein said means for recognizing a doublet and the three bits following the doublet comprise means for comparing the identity of the bits of the doublet with each other, and means for comparing the identity of the three bits following the doublet after inversion of the last bit of the three bits following the doublet.

6. The device as claimed in claim 5, wherein said means for recognizing each sequence of p bits comprise five flip flops connected in cascade and delivering five signals to the input of a comparison means operative for simultaneously comparing five successive bits and determining if each sequence of p bits is a doublet followed by a triplet.

7. The device as claimed in claim 3, wherein said means for selecting a bit from each triplet comprise means for selecting the second bit of the triplet when there is identity between the first two bits and the inverse of the third bit of the triplet when there is not identity between the first two bits.

8. The device as claimed in claim 3, wherein said means for selecting a bit from each doublet comprise means for selecting the second bit of each doublet.

9. The device as claimed in claim 7, wherein said means for selecting a bit from each triplet and a bit from each doublet comprise three flip flops connected in cascade, the last two flip flops being operative for delivering information to an input of an error detector means, the first two flip flops being operative for delivering information to an input of a selector means, said selector means being driven by an output of said error detector means, said selector means being operative for delivering the selected information at an output of said selection means.

10. The device as claimed in claim 8, wherein said means for selecting a bit from each triplet and a bit from each doublet comprise three flip flops connected in cascade, the last two flip flops being operative for delivering information to an input of an error detector means, the first two flip flops being operative for delivering information to an input of a selector means, said selector means being driven by an output of said error detector means, said selector means being oprative for delivering the selected information at an output of said selector means.

* * * * *